(12) United States Patent
Hall

(10) Patent No.: US 11,258,811 B2
(45) Date of Patent: Feb. 22, 2022

(54) EMAIL ATTACK DETECTION AND FORENSICS

(71) Applicant: Saudi Arabian Oil Company, Dhahran (SA)

(72) Inventor: Timothy Hall, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 359 days.

(21) Appl. No.: 16/363,647

(22) Filed: Mar. 25, 2019

(65) Prior Publication Data

US 2020/0314125 A1  Oct. 1, 2020

(51) Int. Cl.
*H04L 29/06* (2006.01)
*G06F 16/28* (2019.01)

(52) U.S. Cl.
CPC ........ *H04L 63/1425* (2013.01); *G06F 16/285* (2019.01); *H04L 63/1441* (2013.01)

(58) Field of Classification Search
CPC .. H04L 63/1425; H04L 63/1441; H04L 63/00
See application file for complete search history.

(56) References Cited

U.S. PATENT DOCUMENTS

| | | | |
|---|---|---|---|
| 6,321,267 B1 | 11/2001 | Donaldson | |
| 6,757,830 B1 | 6/2004 | Tarbottom et al. | |
| 7,051,077 B2 | 5/2006 | Lin | |
| 7,096,498 B2 | 8/2006 | Judge | |
| 7,891,001 B1 | 2/2011 | Greenawalt et al. | |
| 8,443,447 B1 | 5/2013 | Chen et al. | |
| 8,560,614 B2 | 10/2013 | Morrey | |
| 9,177,293 B1 | 11/2015 | Gagnon et al. | |
| 2003/0167402 A1 | 9/2003 | Stolfo et al. | |
| 2005/0071432 A1 | 3/2005 | Royston | |
| 2005/0228916 A1* | 10/2005 | Telesco | G06F 21/554 710/200 |
| 2015/0096024 A1 | 4/2015 | Haq et al. | |
| 2016/0080420 A1* | 3/2016 | Ray | H04L 63/0263 726/1 |
| 2016/0099959 A1* | 4/2016 | Yanovsky | H04L 51/12 726/23 |
| 2016/0182451 A1 | 6/2016 | Nandagopal et al. | |
| 2019/0044975 A1* | 2/2019 | Schafer | H04L 61/307 |

(Continued)

FOREIGN PATENT DOCUMENTS

EP  1766494  3/2007

OTHER PUBLICATIONS

"Barracuda Emily Security Service User Manual," newest version published Nov. 2017, 127 pages.

(Continued)

*Primary Examiner* — Minh Chau Nguyen
(74) *Attorney, Agent, or Firm* — Fish & Richardson P.C.

(57) ABSTRACT

The subject matter of this specification can be embodied in, among other things, a computer-implemented method for securing email communications that includes receiving data including an email calculating a hash of the data, parsing the data into one or more atomic components, classifying the atomic component based on a collection of predetermined threat level categories, and providing an indication of a threat level category of the atomic component.

16 Claims, 4 Drawing Sheets

(56) References Cited

U.S. PATENT DOCUMENTS

2019/0260794 A1* 8/2019 Woodford .............. G06N 20/20
2019/0260804 A1* 8/2019 Beck ................... H04L 63/1433

OTHER PUBLICATIONS

"PAN-OS Administrator's Guide," Version 8.1, Palo Alto Networks, Nov. 8, 2018, 1168 pages.

Crocker, "Standard for the Format of ARPA Internet Text Messages," available on or before Aug. 13, 1982, retrieved on Apr. 8, 2019, retrieved from URL <https://tools.ietf.org/html/rfc822>.

Fireeye, "FireEye Email Security Server Edition," Data Sheet, 2018, 7 pages.

Hameed, "Malicious Email Detection & Filtering System Using Bayesian Machine Learning Algorithm," Department of Computer System Engineering University College of Engineering and Technology, the Islamia University of Bahawalpur, Dec. 2015, 111 pages.

inana.org', "Message Headers," available on or before Dec. 13, 2018, last edited Apr. 1, 2019, retrieved on Apr. 8, 2019, retrieved from URL <https://www.iana.org/assignments/message-headers/message-headers.xhtml>.

Resnick, "Internet Message Formal," Network Working Group, Draft Standard, Qualcomm Incorporated, Oct. 2008, retrieved on Apr. 8, 2019, retrieved from URL <https://tools.ietf.org/html/rfc5322>.

Reversing Labs, "TitaniumCore Malware Analysis Solution: World's Fastest, Most Comprehensive Static Analysis for Threat intelligence," DataSheet, 2018, 2 pages.

Trend Micro, "Trend Micro Scanmail Suite for Microsoft Exchange," Datasheet, 2018, 4 pages.

PCT International Search Report and Written Opinion in International Appln. No. PCT/US2020/024384, dated May 20, 2020, 13 pages.

GCC Examination Report in GCC Appln. No. GC 2020-3924, dated Aug. 30, 2021, 3 pages.

* cited by examiner

EMAIL ATTACK DETECTION AND FORENSICS

TECHNICAL FIELD

This instant specification relates to systems for detecting and diagnosing email threats.

BACKGROUND

A many emails sent over the Internet are unsolicited and unwanted by the recipients. Contained within this population of emails are malicious attacks, scams, phishing attempts, as well as advanced threats perpetrated by nation state actors to compromise systems and networks. Cyber attackers and advanced adversaries use email as a primary attack vector to surreptitiously invade corporate and government networks, gain a foothold, and pursue their mission objectives ranging from intellectual property and data theft to the destruction of systems, networks and industrial processes.

There have been many methods derived to identify unsolicited email (commonly known as "spam") and prevent delivery to the user's in box, thereby shielding users from malicious intent. Advanced adversaries, however, have leveraged business email compromise (BEC), supply chain attacks, and other methods to abuse the trust relationship between communicating parties and increase the difficulty in detecting malicious email messages by convincingly impersonating one party through technical disguises, legitimate account takeover, or the application of intricate reconnaissance and espionage trade craft. As attacks move up the ladder of advanced threat actors, reputation based methods, simple signatures and rules, and comparison or 'sameness' based methods can fail to provide the level of protection necessary to detect and evade such attacks.

SUMMARY

In general, this document describes systems for detecting and diagnosing email threats.

In a first aspect, a computer-implemented method for securing email communications includes receiving data including an email calculating a hash of the data, parsing the data into one or more atomic components, classifying the atomic component based on a collection of predetermined threat level categories, and providing an indication of a threat level category of the atomic component.

Various implementations can include some, all, or none of the following features. The collection of predetermined threat level categories can include malicious, benign, and inconclusive. The method can also include identifying a data type of the atomic component, identifying, based on the data type, an analysis module from a collection of predetermined analysis modules, wherein each of the analysis module is configured to parse a predetermined data type, determining, by the analysis module, a signature based on the atomic component, comparing, by the analysis module, the determined signature to a collection of predetermined signatures, wherein each of the predetermined signatures is associated with one of the predetermined threat level categories, identifying, based on the comparing, a predetermined signature from the collection of predetermined signatures, identifying a predetermined threat level category associated with the identified predetermined signature, and classifying the atomic component into one of the predetermined threat level categories based on the identified predetermined threat level category. The method can also include storing a data record in a collection of data records based on the classifying. The method can also include analyzing the collection of data records, identifying, based on the analyzing, a statistical trend within the collection of data records, identifying, based on the analyzing, a selected type of predetermined signatures associated with the statistical trend, determining, from the predetermined threat level categories, a threat level presented by the atomic components represented by the data records from which the statistical trend was identified, and updating the predetermined threat level category of one or more predetermined signatures based on the determined threat level. The atomic components can be selected from a group comprising a message header, a network address, a domain name, an email address, a message field, a message subject, a message body, a sequence of bytes of the data, a string of characters of the email, and a file attachment. The method can also include queuing the received data in a buffer, and retrieving, before parsing, the queued data from the buffer. The method can also include displaying the provided indication on a display device.

In another aspect, a system for securing email communications includes an email processing module configured to receive email data including an email from an email sender, and parse the email data into one or more atomic components, a forensic archiving module configured to receive and store email data, one or more analysis modules configured to process one or more types of atomic components and classify the atomic components based on a collection of predetermined threat level categories, and an output module configured to provide indications of threat level categories of atomic components. The analysis module can be further configured to determine signatures based on atomic components and store the signatures in a signature database. The output module can be further configured to identify and provide indication of threat level categories of atomic components based on a comparison of determined signatures and predetermined signatures of atomic components and threat level categories associated with atomic components. The atomic components can be selected from a group comprising a message header, a network address, a domain name, an email address, a message field, a message subject, a message body, and a file attachment. The analysis module can be further configured to store a data record in collection of data records based on the classifying, wherein the collection of data records is stored by an artifact database. The output module can be further configured to analyze the collection of data records, identify, based on the analyzing, a statistical trend within the collection of data records, identify, based on the analyzing, a selected type of predetermined signatures associated with the statistical trend, determine, from the predetermined threat level categories, a threat level presented by the atomic components represented by the data records from which the statistical trend was identified, and update the predetermined threat level category of one or more predetermined signatures based on the determined threat level. The system can also include a message queue module configured to receive email data from the email source, queue the received email data in a buffer, and provide the queued data from the buffer to the email processing module. The system can also include a display device configured to display the provided indications.

In another aspect, a non-transitory computer storage medium is encoded with a computer program, the program comprising instructions that when executed by data processing apparatus cause the data processing apparatus to perform operations including receiving data including an email, calculating a hash of the data, parsing the data into one or more atomic components, classifying the atomic component based on a collection of predetermined threat level categories, and providing an indication of a threat level category of the atomic component for display on a display device.

Various implementations can include some, all, or none of the following features. The collection of predetermined threat level categories can include malicious, benign, and inconclusive. The operations can also include identifying a data type of the atomic component, identifying, based on the data type, an analysis module from a collection of predetermined analysis modules, wherein each of the analysis module is configured to parse a predetermined data type, determining, by the analysis module, a signature based on the atomic component, comparing, by the analysis module, the determined signature to a collection of predetermined signatures, wherein each of the predetermined signatures is associated with one of the predetermined threat level categories, identifying, based on the comparing, a predetermined signature from the collection of predetermined signatures, identifying a predetermined threat level category associated with the identified predetermined signature, and classifying the atomic component into one of the predetermined threat level categories based on the identified predetermined threat level category. The operations can also include storing a data record in a collection of data records based on the classifying, analyzing the collection of data records, identifying, based on the analyzing, a statistical trend within the collection of data records, identifying, based on the analyzing, a selected type of predetermined signatures associated with the statistical trend, determining, from the predetermined threat level categories, a threat level presented by the atomic components represented by the data records from which the statistical trend was identified, and updating the predetermined threat level category of one or more predetermined signatures based on the determined threat level.

The systems and techniques described here may provide one or more of the following advantages. First, a system can provide high fidelity intelligence that provides a dataset to identify future threats and trends. Second, the system can apply artificial intelligence and machine learning algorithms to predict attacks or the probability of maliciousness. Third, previously undetected security breaches may be detected by the retroactive application of custom developed signatures across the dataset. Fourth, the system can provide increased visibility into email based threats that other security controls may have missed. Fifth, adversary dwell time can be reduced due to early detection or detection of attacks previously missed by existing security controls. Sixth, the risk of impacts resulting from undetected attacks due to low visibility into email traffic can be reduced. Seventh, the system can reduce operational impacts of interjecting custom detection signatures into the production traffic flow.

The details of one or more implementations are set forth in the accompanying drawings and the description below. Other features and advantages will be apparent from the description and drawings, and from the claims.

DESCRIPTION OF DRAWINGS

Like reference numbers and designations in the various drawings indicate like elements.

DETAILED DESCRIPTION

This document describes systems and techniques for detecting and diagnosing email threats.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In general, in order to detect and defend against email attacks, a forensic level approach to email analysis is used. The technique leverages automated analysis, internal and/or external threat intelligence data, and provides an opportunity for correlation across a historical data set. Additionally, this provides human analysts with technical insight into email borne threats, the data to develop advanced rules and signatures, and the ability to detect previously undetected attacks in the historical data set.

In general terms still, an email threat detection and forensic system identifies and analyzes atomic components of email messages and attachments and makes determinations of maliciousness of the atomic components. Maliciousness can be determined by breaking down the email message and attachments into individual components, analyzing the data components for indicators of potential maliciousness, and storing the data components, against which correlation of future incoming messages will be performed. If the message or attachment is determined to be malicious, human analysts may be alerted to make additional inquiries or take appropriate response actions. A determination of maliciousness may be a simple yes or no, a range of numeric values representing no maliciousness to absolutely malicious, or a scale of low probability to high probability of maliciousness and is at the discretion of the implementer. The atomic components of the message, attachments, meta data, and analysis results are submitted to artificial intelligence algorithms using machine learning or other techniques to identify anomalies and make predictions based on learned characteristics of the input data set and past correlations or determinations of maliciousness.

Figure 1:
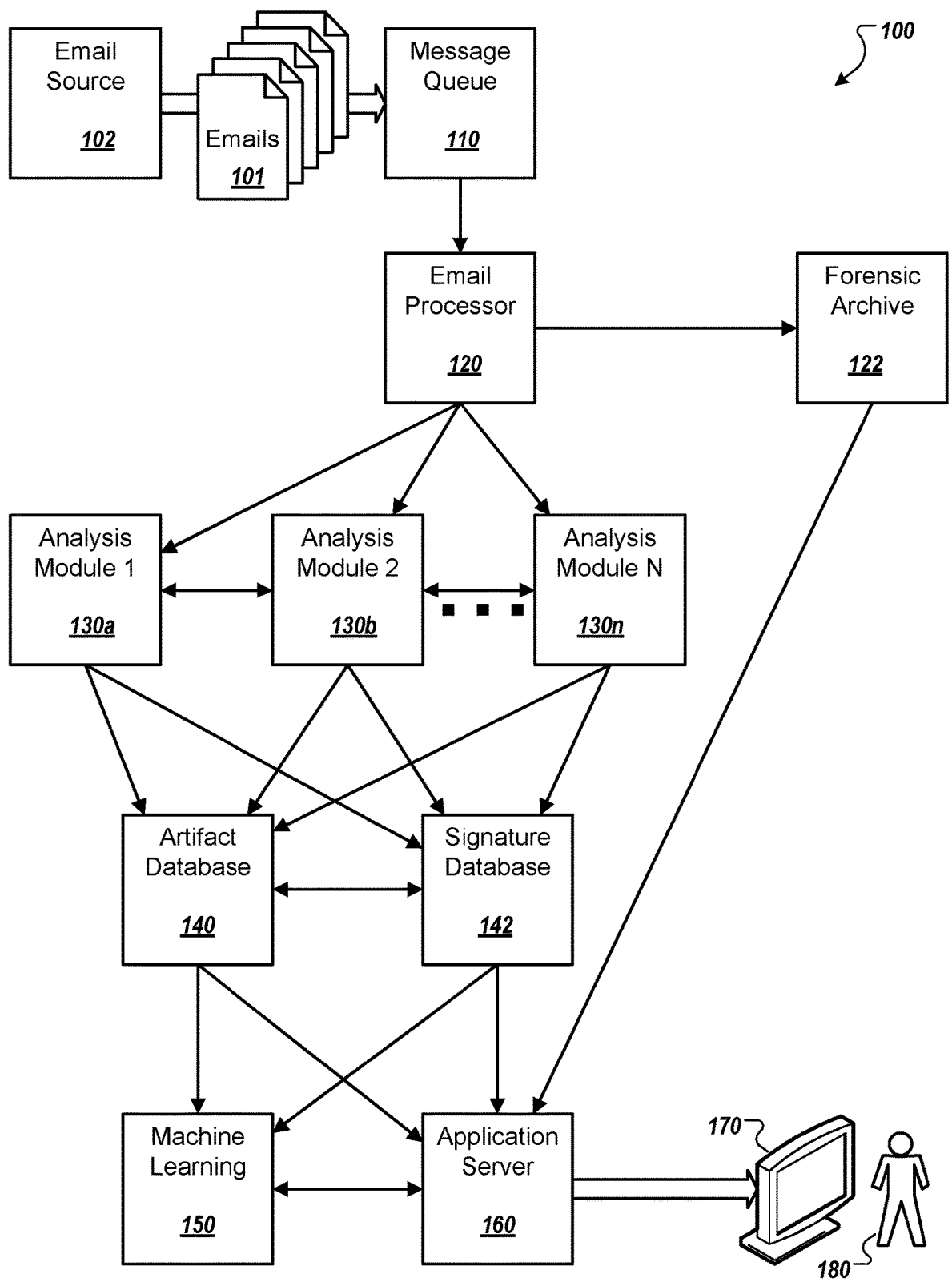
FIG. 1 is a block diagram of an example system for detecting and diagnosing email threats.

FIG. 1 is a block diagram of an example system 100 for detecting and diagnosing email threats in email communications. In the system 100, a collection of email messages 101 are sent by an email source 102. The email messages 101 are received by a message queue module 110. The message queue module 110 is configured as a first-in-first-out (FIFO) buffer. In some implementations, the message queue module 110 can receive copies of the email messages 101 while the email messages 101 are also being provided to their intended recipients. For example, the message queue module 110 can buffer incoming email messages 101 where they can await threat detection processing without delaying their delivery.

In various implementations, the email message acquisition process may be any of several ways of collecting the email messages 101 for processing. In the illustrated example, the email messages 101 are acquired from the email source 102 by the system 100 in a passive manner and are not in the direct communications flow of the email traffic. Instead, the email messages 101 can be mirrored to the system 100 directly by a mail transfer agent (MTA), if the capability exists, or can be mirrored to the system 100 by using a tap infrastructure, where the email messages 101 may be "sniffed" off the network, or received by another MTA.

An email processing module 120 retrieves the email messages 101 from the message queue module 110. The email processing module 120 is configured to calculate hashes of the raw message and send the hash values and raw message to a forensic archive 122 for storage.

A cryptographic hash is intended to capture a non-immutable value representing the message in its entirety. Any change to the message will alter the value of the hash. If at a later date there is some question as to the integrity of the message as it was delivered, the hash value of the original incoming message can be compared to any other form or copy of the message to determine bit for bit sameness. Context triggered piecewise hashes, also called "fuzzy hashes" are calculated to detect and correlate inputs that have sequences of identical bytes, even though bytes in between the sequences could be different in length and content. Fuzzy hash values, when compared, may reveal messages and content that may be related but not identical.

The forensic archive 122 is a secure storage platform that stores the original email messages and their hash values in a forensically sound manner for reference later if required. Receipts of the messages are timestamped and the initial chain of custody is maintained. Should there be a need to reference the original email message and attachments as delivered, the forensic archive 122 can protect the integrity of such information until it is needed.

The email processing module 120 is also configured to parse the data contained in the email messages 101. The email processing module 120 is configured to decode email message data and parse the data into atomic components, such as message headers, email fields, message body, network addresses (such as the sender's address, the destination address, intermediary routing addresses), domain names (such as the sender's domain name, the destination domain name, intermediary routing domain names), email addresses (such as the sender's address, the destination address, intermediary routing addresses), subject, and other types of email fields and data. The email processing module 120 then sends the attachments and atomic components to a collection of analysis modules 130a-103n for further processing, based on the type of data that the atomic components and attachments included in the email messages 101.

The analysis modules 130a-103n are each configured to receive and process predetermined types of atomic components and attachments, for example, depending on the type of file or data they carry. For example, the analysis module 130a may be configured to process domain names, the analysis module 130b may be configured to process email addresses, and the analysis module 130n may be configured to process text-based attachments. In some implementations, some types of analysis modules may be configured to perform natural language processing (NLP) (for example, to extract/identify suspicious phrases, words, combinations of terms). In some implementations, some types of analysis modules may be configured to parse text from different languages (for example, English, Arabic, Spanish, Russian, Chinese, or any other language). In some implementations, some types of analysis modules may be configured to parse various types of attachments, such as text (*.TXT), binary (*.JPG, *.GIF, *.PNG, *.EXE), documents (*.DOC, *.PDF), and compressed files (*.zip, *.rar). In some implementations, some types of analysis modules may be configured to identify and analyze hyperlinks, physical addresses, telephone numbers, and identification numbers (such as Social Security and credit card numbers). Various ones of the analysis modules 130a-130n have specific analysis capabilities that may produce additional metadata (such as a discrepancy between a hyperlink's text and address, or between a sender's displayed and actual address). For example, one or more of the analysis modules 130a-103n could be configured to enrich existing artifacts with contextual data by correlating them with internal and external cyber threat intelligence data. One or more of the analysis modules 130a-130n could be configured to submit executable code and file types to sandbox systems that run the executable code and monitor its output and behavior, collecting newly generated artifacts and metadata, which in turn can be submitted to other appropriate modules for further analysis.

The analysis modules 130a-130n are configured to determine threat levels posed by the atomic components and attachments that they process. The analysis modules 130a-130n are configured to categorize and associate ones of a collection of predetermined threat levels to the processed atomic components. For example, a sender who is known to be a source of threatening material may send an email with a body that has not been seen before, and a harmless embedded bitmap file. In such an example, the analysis modules 130a-130n may classify the sender's address as "malicious", the bitmap as "benign", and the body text as "inconclusive". The classifications of "malicious", "benign", and "inconclusive" are merely examples of classifications that can be used, and more or fewer classifications having similar or different names can be used (for example, "high", "low", and "unknown", or "safe", "unsafe", and "unknown").

The atomic components and attachments, along with their classification information, are sent by the analysis modules 130a-130n to an artifact database 140. The artifact database 140 is a centralized collection point of intelligence data that forms the basis of a historical dataset from which future artifact correlations may be made, indicators of compromise or threats can be identified for signature generation, and linkages drawn between multiple email borne attacks initially appearing to be unrelated in the absence of such correlation. The artifact database 140 may be accessed by a human analyst 180 through full text searching functions presented by an application server 160 as well as automatically correlate linked or related artifacts, messages, and received email transmissions over time, via programs and scripts configured to make such correlations and present alerts or notifications through analyst interfaces presented by the application server 160 or through application programming interface and electronic data interchange between systems developed to perform such work. For example, multiple malicious email attacks appearing to come from multiple email addresses or varied transmission infrastructure may possess shared characteristics such as originating from the same autonomous system (a collection of Internet Protocol routing prefixes under the control of a single administrative entity) or exact or similar executable code embedded in attachments, or as independent attachments to email messages. In another example, artifacts enriched with contextual data from external threat intelligence may reveal correlations to specific threat actors, their tactics and techniques, and toolsets that may aid in attributing malicious emails and attachments to specific threat actors targeting the enterprise, provide insight into adversary motives, and lead to predicting future attacks or actions by those actors based on known attack stages.

The analysis modules 130a-130n reference a signature database 142 to test a component for a signature match, the results of which are stored with the analysis results in the artifact database 140. The signature database 142 contains technical definitions of known malicious objects or derived data (such as a calculated hash value) that is referenced in an analysis process to determine if an identified artifact matches the signature characteristics at which time the match is documented and linked to the artifact. The human analyst 180 may be alerted to the detection of a signature match through an interface presented by the application server 160, an automated alert sent to a monitoring system, or even an email message generated and sent to a designated mailbox for review by the human analyst 180. As malicious emails, attachments, and artifacts are identified, for which no signature exists, a signature may be developed and added to the signature database 142, that is then part of the collection of signatures newly acquired artifacts are checked against. Once a new signature is added to the signature database 142, an automated process to re-scan all acquired artifacts, the entire historical dataset, or even the raw messages stored in the forensic archive 122 may be initiated to detect previous attacks that may not have been identified at the time of acquisition. The human analyst 180 may then be alerted to the detection of a retroactive signature match through an interface presented by the application server 160, an automated alert sent to a monitoring system, or even an email message generated and sent to a designated mailbox for review by the human analyst 180.

Objects, indicators, metadata and results arising out of the processing by analysis modules 130a-130n, the artifact database 140, and the signature database 142 are sent to a machine learning module 150. The machine learning module 150 is configured with artificial intelligence components that implement machine learning or other algorithms configured to identify anomalous characteristics, trends, or make predictions of maliciousness or future attacks, based on the data provided from the analysis modules 130a-130n, the artifact database 140, and the signature database 142. The human analyst 180 can make decisions regarding security controls, mitigation options, network configurations and technology implementations based on the resulting data.

Artificial Intelligence is a method of training algorithms to learn to make decisions of which the machine learning module 150 performs a subset, to the system 100 to take input data and learn to make accurate predictions. In some implementations there may generally be two types of models used, supervised and unsupervised, which require labeled data (supervised) or may function with unlabeled data (unsupervised). Both learning models may be productive, especially in examples in which a partially labeled data-set resulting from data processed, analyzed, and residing in the artifact database 150. Examples of models and algorithms that may be applied to the data set in the artifact database 150 to produce relevant results can include support vector machines, linear or logistic regression, naive Bayes, linear discriminant analysis, decision trees, k-nearest neighbor algorithms, neural networks, k-means, density-based spatial clustering of applications with noise, and mixture models.

The outputs of artifact database 140, the signature database 142, and the machine learning module 150 presents results to an application server module 160. The application server module 160 is accessible from a display terminal 170 or other type output hardware (such as a computer, tablet, smart phone) that is configured to provide indications and other forms of tangible outputs configured to provide a human analyst 180 with an interface to view or otherwise receive such results. The application server module 160 is also configured to feed integrations with external systems such as threat intelligence platforms. For example, the data generated by the analysis modules 130a-130n, signature match detections, machine learning classifications, and predictions can be used as input into external systems designed to provide threat intelligence management, intelligence sharing with third parties, and other artifact repositories. In another example, data can be sent to external systems for peudo real time correlation with other network based events such as a Security Information and Event Management (SIEM) system, Incident Response Platforms (IRP), and Security Orchestration and Automation Systems (SOAR).

In use, high fidelity intelligence is gathered by the system 100 as a result of the decomposition of emails that provides a valuable dataset to identify future threats and trends as well as the opportunity to apply artificial intelligence and machine learning algorithms to predict attacks or the probability of maliciousness. In some implementations, as a result of the analytical breakdown of emails and the forensic archive, previously undetected security breaches may be detected by the retroactive application of custom developed signatures across the dataset. In some implementations, the system 100 can provide increased visibility into email based threats that other security controls may have missed. In some implementations, adversary dwell time can be reduced due to early detection or detection of attacks previously missed by existing security controls. In some implementations, risk of impacts resulting from undetected attacks due to low visibility into email traffic can be reduced. In some implementations, the system 100 can reduce operational impacts of interjecting custom detection signatures into the production traffic flow by providing detection in a passive manner and no operational impact due to poorly designed or tested signatures.

Figure 2:
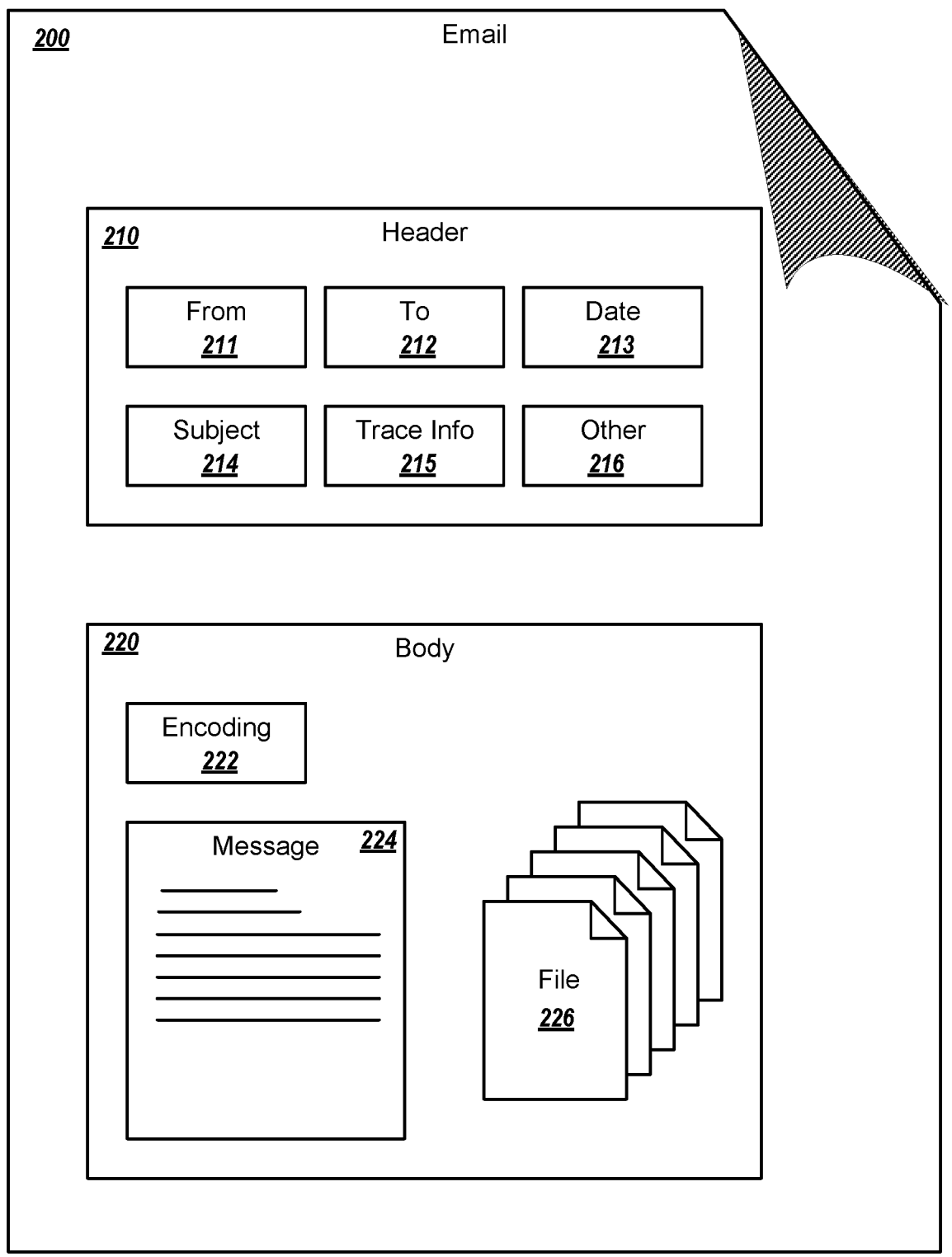
FIG. 2 is a block diagram that shows an example email message.

FIG. 2 is a block diagram that shows an example email message 200. In some implementations, the email message 200 can be one or more of the example email messages 101 of FIG. 1.

The email message 200 is a collection of data that can be interpreted as an email message. The email message 200 includes a header 210 and a body 220.

The header 210 includes a collection of atomic components (or elements). The collection of atomic components includes a "from" field 211. For example, the "from" field 211 can provide one or more of an email address, network address, domain name, name, or other information that can identify (or allegedly identify) the author of the email message 200.

The collection of atomic components includes a "to" field 212. For example, the "to" field 212 can provide one or more of an email address, network address, domain name, name, or other information that can identify (or allegedly identify) the target recipient of the email message 200.

The collection of atomic components includes a date field 213. For example, the date field 213 can indicate when email message 200 was authored or sent.

The collection of atomic components includes a subject field 214. For example, the subject field 214 can include formatted or unformatted data that describes a subject (or alleged subject) of the email message 200.

The collection of atomic components includes a trace information field 215. For example, the trace information field 215 can provide one or more network addresses that describe the network path(s) and intermediate email server(s) that the email message 200 traveled through on its way to the example system 100.

The collection of atomic components includes other fields 216. For example, the atomic components of the header 210 can include other information, such as encryption or authentication information (checksums, public keys) that is intended to protect the integrity of the data in the email message 200 or the message represented by the data in the email message 200. In some implementations, atomic components collected from the header 210 may be data related to any field included in the header 210, which is documented in an Internet Standard or added by a system or application that generated or transmitted the message.

The body 220 includes another collection of atomic components (or elements). The collection of atomic components includes an encoding field 222. The encoding field 222 indicates a type of encoding the data in the email message 200. For example, the encoding field 222 can indicate that the email message 200 is encoded using the commonly-used UTF-8 format. UTF-8 supports many different types of characters, including international characters. UTF-8 can represent any character in the Unicode standard, and is backward-compatible with ASCII (American Standard Code for Information Interchange). UTF-8 is commonly used when sending emails with non-Latin data (such as the Euro symbol, Hebrew, Chinese, Japanese, Russian). Other examples of encoding standards include ISO-8859-1, Shift_JIS, EUC-JP, and ISO-2022-JP.

The collection of atomic components includes a message 224. In general, the message 224 includes a textual content that can be provided in a formatted or unformatted style. For example, unformatted text can be humanly read without additional processing. Formatted text may include readable text along with metadata that describes the formatting and layout of the text. Examples of such formatting include hypertext markup language (HTML), extensible markup language (XML), and Rich Text Format (RTF).

The collection of atomic components includes one or more file attachments 226. In some implementations, the file attachments 226 can be text or binary files that have been encoded so they can be transmitted along with the message 224. Examples of encodings used for file attachments 226 include MIME (Multipurpose Internet Mail Extensions), uuencode, BinHex, and xxencode.

In various implementations, the example analysis modules 130a-130n of FIG. 1 can be configured to parse, process, or otherwise interpret predetermined atomic components of the header 210 and the body 220. For example, the analysis module 130n may be configured to extract binary attachments and perform scanning for computer viruses or other forms of malware. In another example, the analysis module 130a can be configured to parse HTML-encoded text while the analysis module 130b can be configured to parse RTF-encoded text. In another example, the analysis module 130a can be configured to parse audio file attachments while the analysis module 130b can be configured to scan executable binary files (*.exe) for viruses. In some implementations, the analysis modules 130a-130n may be configured to pass extracted information among each other. For example, the analysis module 130a may be configured to process "ZIP" compressed files. The analysis module 130a may extract a rich text file from a "ZIP"-compressed attachment, and pass the rich text file on to the analysis module 130b, which is configured to parse rich text files. The analysis module 130b may find that that rich text file has a "ZIP"-compressed file embedded within itself, and the analysis module 130b may extract the compressed file and pass it back to the analysis module 130a for further processing.

Figure 3:
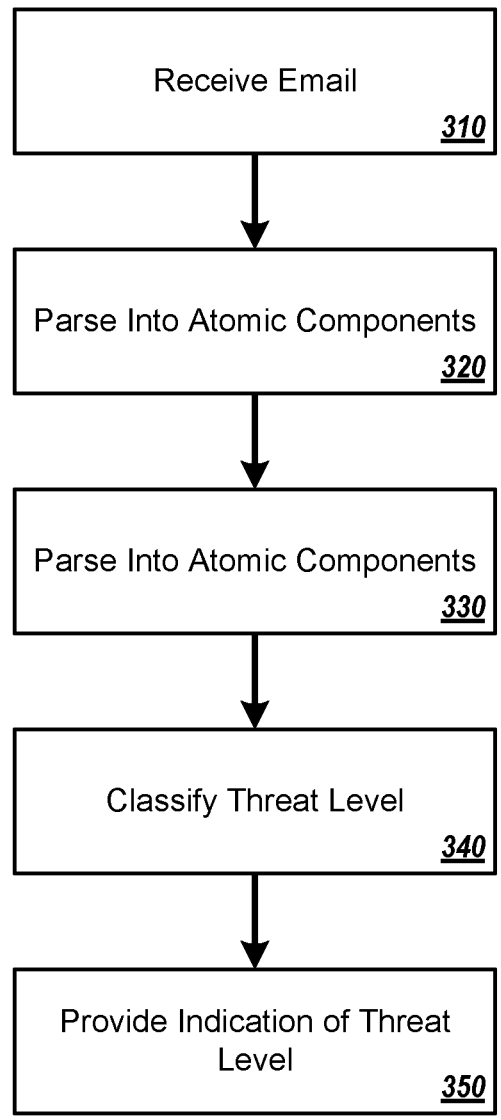
FIG. 3 is a flow diagram of an example process for detecting and diagnosing email threats.

FIG. 3 is a flow diagram of an example process 300 for detecting and diagnosing email threats. In some implementations, the process 300 may be performed by part or all of the example system 100 of FIG. 1.

At 310 data comprising an email is received. For example, the example system 100 can receive the email messages 101 from the email sender 102.

At 320, a hash of the data is calculated. For example, email processing module 120 is configured to calculate a hash of the raw message and send that hash to a forensic archive 122 for storage.

At 330, the data is parsed into one or more atomic components. In some implementations, the atomic components are selected from a group comprising a message header, a network address, a domain name, an email address, a message field, a message subject, a message body, and a file attachment. For example, the email processing module 120 is configured to decode email message data and parse the data into atomic components, such as message headers, email fields, message body, network addresses (such as the sender's address, the destination address, intermediary routing addresses), domain names (such as the sender's domain name, the destination domain name, intermediary routing domain names), email addresses (such as the sender's address, the destination address, intermediary routing addresses), subject, and other types of email fields and data.

At 340, the atomic component is classified based on a collection of predetermined threat level categories. In some implementations, the collection of predetermined threat level categories comprises malicious, benign, and inconclusive. For example, the analysis modules 130a-130n can classify atomic components as "malicious", "benign", and "inconclusive", or substantially equivalent terms.

At 350 an indication of a threat level category of the atomic component is provided. For example, the application server module 160 can provide the threat level category can be provided to the display terminal 170. In some implementations, the process 300 can also include displaying the provided indication on a display device. For example, an indication of the threat level category provided by the application server module 160 can be displayed on the display terminal 170. In another example, the indication of the threat level category provided by the application server module 160 can be provided as an audible (sound) indication or tactile (vibration) indication.

In some implementations, the process 300 can include identifying a data type of the atomic component, identifying, based on the data type, an analysis module from a collection of predetermined analysis modules, where each of the analysis modules is configured to parse a predetermined data type, determining, by the analysis module, a signature based on the atomic component, comparing, by the analysis module, the determined signature to a collection of predetermined signatures, where each of the predetermined signatures is associated with one of the predetermined threat level categories, identifying, based on the comparing, a predetermined signature from the collection of predetermined signatures, identifying a predetermined threat level category associated with the identified predetermined signature, and classifying the atomic component into one of the predetermined threat level categories based on the identified predetermined threat level category. For example, the email processing module 120 can send attachments and atomic components to the collection of analysis modules 130a-130n for further processing based on the type of data that the atomic components and attachments included in the email messages 101.

In some implementations, the process 300 can include storing a data record in a collection of data records based on the classifying. For example, analysis modules 130a-130n can send their outputs to the artifact database 140 and the signature database 142.

In some implementations, the process 300 can including analyzing the collection of data records, identifying, based on the analyzing, a statistical trend within the collection of data records, identifying, based on the analyzing, a selected type of predetermined signatures associated with the statistical trend, determining, from the predetermined threat level categories, a threat level presented by the atomic components represented by the data records from which the statistical trend was identified, and updating the predetermined threat level category of one or more predetermined signatures based on the determined threat level. For example, a previously unknown attachment or atomic component may initially be classified as "unknown", but if the frequency arrivals of such items were to increase (perhaps as part of a denial of service, or DOS, attack), future arrivals may be classified as "malicious". Existing records of such items may also be reclassified from "benign" to "malicious". In another example, items that are determined as including executable, and therefore potentially malicious code (such as viruses, Trojans, or worms) may initially be classified as "malicious" out of an abundance of caution, may later be found to be safe (in other words, a false alarm), and the records for past and future observations of such executables may be identified as being "benign".

In some implementations, the process 300 can also include queuing the received data in a buffer, and retrieving, before parsing, the queued data from the buffer. For example, the email messages 101 can be received by the message queue module 110, and the message queue module 110 can be configured as a first-in-first-out (FIFO) buffer from which the email messages 101 can later be retrieved by the email processing module 120.

Figure 4:
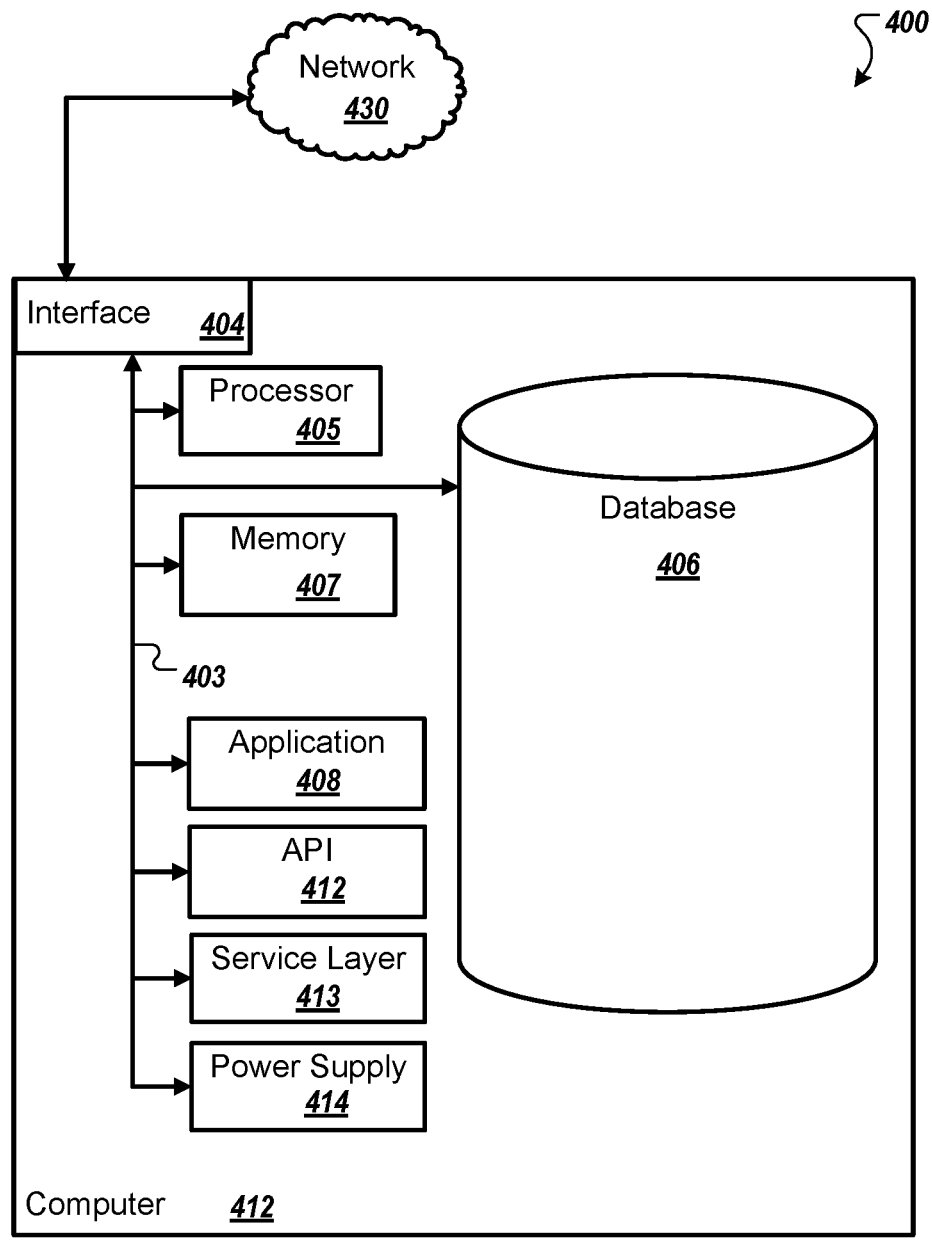
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

In a first aspect, a computer-implemented method for securing email communications includes receiving data including an email calculating a hash of the data, parsing the data into one or more atomic components, classifying the atomic component based on a collection of predetermined threat level categories, and providing an indication of a threat level category of the atomic component.

Various implementations can include some, all, or none of the following features. The collection of predetermined threat level categories can include malicious, benign, and inconclusive. The method can also include identifying a data type of the atomic component, identifying, based on the data type, an analysis module from a collection of predetermined analysis modules, wherein each of the analysis module is configured to parse a predetermined data type, determining, by the analysis module, a signature based on the atomic component, comparing, by the analysis module, the determined signature to a collection of predetermined signatures, wherein each of the predetermined signatures is associated with one of the predetermined threat level categories, identifying, based on the comparing, a predetermined signature from the collection of predetermined signatures, identifying a predetermined threat level category associated with the identified predetermined signature, and classifying the atomic component into one of the predetermined threat level categories based on the identified predetermined threat level category. The method can also include storing a data record in a collection of data records based on the classifying. The method can also include analyzing the collection of data records, identifying, based on the analyzing, a statistical trend within the collection of data records, identifying, based on the analyzing, a selected type of predetermined signatures associated with the statistical trend, determining, from the predetermined threat level categories, a threat level presented by the atomic components represented by the data records from which the statistical trend was identified, and updating the predetermined threat level category of one or more predetermined signatures based on the determined threat level. The atomic components can be selected from a group comprising a message header, a network address, a domain name, an email address, a message field, a message subject, a message body, a sequence of bytes of the data, a string of characters of the email, and a file attachment. The method can also include queuing the received data in a buffer, and retrieving, before parsing, the queued data from the buffer. The method can also include displaying the provided indication on a display device.

In another aspect, a system for securing email communications includes an email processing module configured to receive email data including an email from an email sender, and parse the email data into one or more atomic components, a forensic archiving module configured to receive and store email data, one or more analysis modules configured to process one or more types of atomic components and classify the atomic components based on a collection of predetermined threat level categories, and an output module configured to provide indications of threat level categories of atomic components. The analysis module can be further configured to determine signatures based on atomic components and store the signatures in a signature database. The output module can be further configured to identify and provide indication of threat level categories of atomic components based on a comparison of determined signatures and predetermined signatures of atomic components and threat level categories associated with atomic components. The atomic components can be selected from a group comprising a message header, a network address, a domain name, an email address, a message field, a message subject, a message body, and a file attachment. The analysis module can be further configured to store a data record in collection of data records based on the classifying, wherein the collection of data records is stored by an artifact database. The output module can be further configured to analyze the collection of data records, identify, based on the analyzing, a statistical trend within the collection of data records, identify, based on the analyzing, a selected type of predetermined signatures associated with the statistical trend, determine, from the predetermined threat level categories, a threat level presented by the atomic components represented by the data records from which the statistical trend was identified, and update the predetermined threat level category of one or more predetermined signatures based on the determined threat level. The system can also include a message queue module configured to receive email data from the email source, queue the received email data in a buffer, and provide the queued data from the buffer to the email processing module. The system can also include a display device configured to display the provided indications.

In another aspect, a non-transitory computer storage medium is encoded with a computer program, the program comprising instructions that when executed by data processing apparatus cause the data processing apparatus to perform operations including receiving data including an email, calculating a hash of the data, parsing the data into one or more atomic components, classifying the atomic component based on a collection of predetermined threat level categories, and providing an indication of a threat level category of the atomic component for display on a display device.

Various implementations can include some, all, or none of the following features. The collection of predetermined threat level categories can include malicious, benign, and inconclusive. The operations can also include identifying a data type of the atomic component, identifying, based on the data type, an analysis module from a collection of predetermined analysis modules, wherein each of the analysis module is configured to parse a predetermined data type, determining, by the analysis module, a signature based on the atomic component, comparing, by the analysis module, the determined signature to a collection of predetermined signatures, wherein each of the predetermined signatures is associated with one of the predetermined threat level categories, identifying, based on the comparing, a predetermined signature from the collection of predetermined signatures, identifying a predetermined threat level category associated with the identified predetermined signature, and classifying the atomic component into one of the predetermined threat level categories based on the identified predetermined threat level category. The operations can also include storing a data record in a collection of data records based on the classifying, analyzing the collection of data records, identifying, based on the analyzing, a statistical trend within the collection of data records, identifying, based on the analyzing, a selected type of predetermined signatures associated with the statistical trend, determining, from the predetermined threat level categories, a threat level presented by the atomic components represented by the data records from which the statistical trend was identified, and updating the predetermined threat level category of one or more predetermined signatures based on the determined threat level.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for securing email communications, comprising:
   receiving data comprising an email;
   calculating a hash of the data;
   parsing the data into one or more atomic components;
   classifying the atomic component based on a collection of predetermined threat level categories;
   storing a data record in a collection of data records based on the classifying;
   analyzing the collection of data records;
   identifying, based on the analyzing, a statistical trend within the collection of data records;
   identifying, based on the analyzing, a selected type of predetermined signatures associated with the statistical trend;
   determining, from the collection of predetermined threat level categories, a threat level presented by atomic components represented by the data records from which the statistical trend was identified;
   updating a predetermined threat level category of one or more predetermined signatures based on the determined threat level; and
   providing an indication of a threat level category of the atomic component.

2. The method of claim 1, wherein the collection of predetermined threat level categories comprises malicious, benign, and inconclusive.

3. The method of claim 1, further comprising:
   identifying a data type of the atomic component;
   identifying, based on the data type, an analysis module from a collection of predetermined analysis modules, wherein each of the analysis module is configured to parse a predetermined data type;
   determining, by the analysis module, a signature based on the atomic component;
   comparing, by the analysis module, the determined signature to a collection of predetermined signatures, wherein each of the predetermined signatures is associated with one of the predetermined threat level categories;
   identifying, based on the comparing, a predetermined signature from the collection of predetermined signatures;
   identifying a predetermined threat level category associated with the identified predetermined signature; and
   classifying the atomic component into one of the predetermined threat level categories based on the identified predetermined threat level category.

4. The method of claim 1, wherein the atomic components are selected from a group comprising a message header, a network address, a domain name, an email address, a message field, a message subject, a message body, a sequence of bytes of the data, a string of characters of the email, and a file attachment.

5. The method of claim 1, further comprising:
   queuing the received data in a buffer; and
   retrieving, before parsing, the queued data from the buffer.

6. The method of claim 1, further comprising displaying the provided indication on a display device.

7. A system for securing email communications, comprising:
   one or more processor devices; and a non-transitory computer-readable medium coupled to the one or more processor devices and having instructions stored thereon that, when executed by the one or more processor devices, cause the one or more processor devices to perform operations of:
  an email processing module configured to receive email data comprising an email from an email sender, and parse the email data into one or more atomic components;
  a forensic archiving module configured to receive and store email data;
  one or more analysis modules configured to:
    process one or more types of atomic components and classify the atomic components based on a collection of predetermined threat level categories; and
    store a data record in a collection of data records based on the classifying; and
  an output module configured to:
    analyze the collection of data records;
    identify, based on the analyzing, a statistical trend within the collection of data records;
    identify, based on the analyzing, a selected type of predetermined signatures associated with the statistical trend;
    determine, from the predetermined threat level categories, a threat level presented by the atomic components represented by the data records from which the statistical trend was identified;
    update a predetermined threat level category of one or more predetermined signatures based on the determined threat level; and
    provide indications of threat level categories of atomic components.

8. The system of claim 7, wherein the analysis module is further configured to determine signatures based on atomic components and store the signatures in a signature database.

9. The system of claim 7, wherein the output module is further configured to identify and provide indication of threat level categories of atomic components based on a comparison of determined signatures and predetermined signatures of atomic components and threat level categories associated with atomic components.

10. The system of claim 7, wherein the atomic components are selected from a group comprising a message header, a network address, a domain name, an email address, a message field, a message subject, a message body, and a file attachment.

11. The system of claim 7, wherein the collection of data records is stored by an artifact database.

12. The system of claim 7, further comprising a message queue module configured to:
  receive email data from the email sender;
  queue the received email data in a buffer; and
  provide the queued data from the buffer to the email processing module.

13. The system of claim 7, further comprising a display device configured to display the provided indications.

14. A non-transitory computer storage medium encoded with a computer program, the program comprising instructions that when executed by data processing apparatus cause the data processing apparatus to perform operations comprising:
  receiving data comprising an email;
  calculating a hash of the data;
  parsing the data into one or more atomic components;
  classifying the atomic component based on a collection of predetermined threat level categories;
  storing a data record in a collection of data records based on the classifying;
  analyzing the collection of data records;
  identifying, based on the analyzing, a statistical trend within the collection of data records;
  identifying, based on the analyzing, a selected type of predetermined signatures associated with the statistical trend;
  determining, from the predetermined threat level categories, a threat level presented by the atomic components represented by the data records from which the statistical trend was identified;
  updating a predetermined threat level category of one or more predetermined signatures based on the determined threat level; and
  providing an indication of a threat level category of the atomic component for display on a display device.

15. The non-transitory computer storage medium of claim 14, wherein the collection of predetermined threat level categories comprises malicious, benign, and inconclusive.

16. The non-transitory computer storage medium of claim 14, the operations further comprising:
  identifying a data type of an atomic component of the one or more of the atomic components;
  identifying, based on the data type, an analysis module from a collection of predetermined analysis modules, wherein each of the analysis module is configured to parse a predetermined data type;
  determining, by the analysis module, a signature based on the atomic component;
  comparing, by the analysis module, the determined signature to a collection of predetermined signatures, wherein each of the predetermined signatures is associated with one of the collection of predetermined threat level categories;
  identifying, based on the comparing, a predetermined signature from the collection of predetermined signatures;
  identifying a predetermined threat level category associated with the identified predetermined signature; and
  classifying the atomic component into one of the collection of predetermined threat level categories based on the identified predetermined threat level category.

* * * * *